United States Patent [19]

Gruneisen

[11] Patent Number: 5,367,527
[45] Date of Patent: Nov. 22, 1994

[54] PHASE-CONJUGATE-COUPLED MULTIMODE OPTICAL FIBER GEOMETRY FOR OPTICAL COUPLING OF LASERS

[75] Inventor: Mark T. Gruneisen, Tijeras, N. Mex.

[73] Assignee: United States of America as represented by the Secretary of the Air Force, Washington, D.C.

[21] Appl. No.: 106,025

[22] Filed: Aug. 13, 1993

[51] Int. Cl.⁵ ............................................. H01S 3/10
[52] U.S. Cl. ................................. 372/9; 372/6; 372/18; 372/92; 372/98; 372/99
[58] Field of Search .................. 372/3, 6, 9, 18, 21, 372/23, 92, 98, 99, 105

[56] References Cited

U.S. PATENT DOCUMENTS

| | | | |
|---|---|---|---|
| 4,869,579 | 9/1989 | Fischer et al | 372/21 X R |
| 4,953,954 | 9/1990 | Ewbank et al | 359/15 |
| 5,038,359 | 8/1991 | Pepper et al | 372/99 |

OTHER PUBLICATIONS

Gruneisen, Mark T. et al, "Phase locking lasers via phase-conjugate-coupled multimode optical fibers", Optical Communications 100 (1993) 173-180, received 28 Dec. 1992.

*Primary Examiner*—Frank Gonzalez
*Attorney, Agent, or Firm*—Donald J. Singer; Irwin P. Garfinkle

[57] ABSTRACT

A method is disclosed for establishing an optical link between two lasers via an optical fiber by directing the output from one laser through an optical fiber and into a second laser and vice vera. Before insertion into the lasers, the output from the respective fibers is phase conjugated in a double phase conjugate mirror. Thus, the disclosed method and apparatus provide a combination of fiber optics, used to transport the light from the lasers, and optical phase conjugation, used to compensate for fiber-induced distortions.

12 Claims, 4 Drawing Sheets

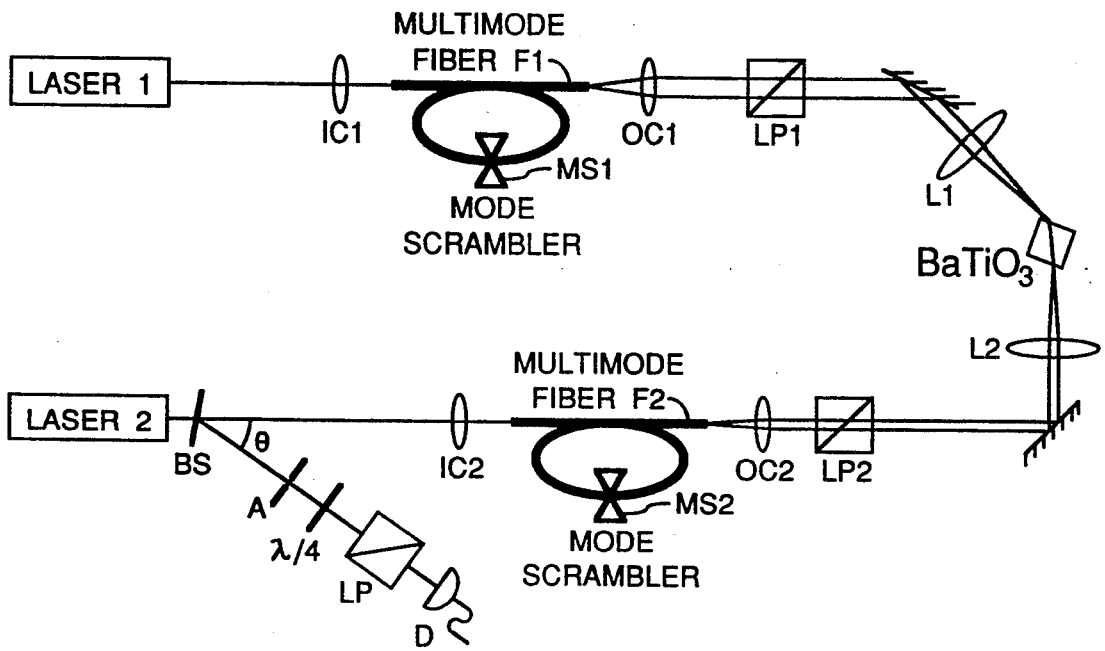
FIG. 4
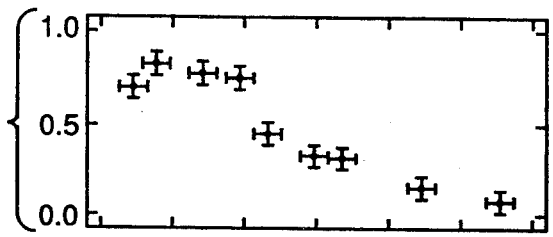
FIG. 5(a) FIBER OUTPUT DEGREE OF POLARIZATION
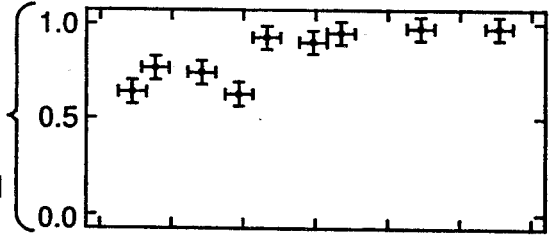
FIG. 5(b) PHASE CONJUGATE DEGREE OF POLARIZATION RECONSTRUCTION
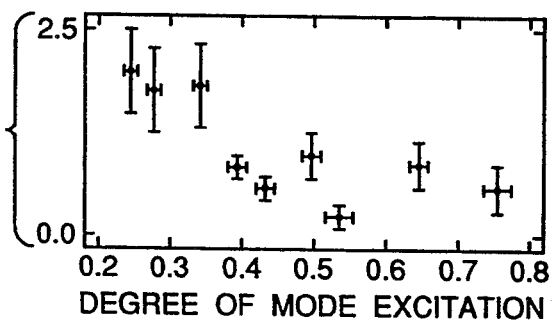
FIG. 5(c) NET COUPLING EFFICIENCY, %
DEGREE OF MODE EXCITATION

PHASE-CONJUGATE-COUPLED MULTIMODE OPTICAL FIBER GEOMETRY FOR OPTICAL COUPLING OF LASERS

STATEMENT OF GOVERNMENT INTEREST

The invention described herein may be manufactured and used by or for the Government for governmental purposes without the payment of any royalty thereon.

This invention is for a phase-conjugate-coupled multimode optical fiber geometry to provide a method for coupling laser light among lasers whereby the coupling light is propagated within waveguides, such as multimode optical fibers; mode matching is achieved automatically via double-phase conjugation in a photorefractive crystal; and phase conjugation compensates for modal dispersion in the multimode optical fibers.

Optical fibers make beam steering simple and easy. Optical fibers also isolate the light beam from environmental disturbances such as air currents. Multimode fibers have relatively large core diameters and are therefore easy to align. Also, a multimode fiber can propagate high spatial frequencies, making it possible to transmit complicated wavefronts and image information.

Conventional methods for mode-matching lasers rely on the tedious and time-consuming precision alignments of lenses and mirrors. Double-phase conjugation in photorefractive crystals requires only coarse alignment. Precision mode-matching is generated by the nonlinear interaction.

A given wavefront propagating through a waveguide, such as a multimode optical fiber will be severely distorted by the process of modal dispersion in the fiber. In a laser coupling setup, wavefront distortions ruin the coupling efficiency since only the component to the wavefront that corresponds to the spatial mode of the laser will contribute to coupling and phase locking. Double-phase conjugation compensates for fiber-induced distortions. Thus, multimode fibers can be used for optically coupling lasers.

BACKGROUND OF THE INVENTION

The goal of scaling lasers to high output powers by phase locking multiple low-power modules has motivated the search for improved laser coupling techniques. Conventional methods for phase locking have relied upon optical coupling to induce cooperative lasing at a frequency and phase that is common to all lasers in the system. The strength of coupling is generally enhanced through optical mode matching wherein the output mode of one resonator is imaged onto the spatial mode of another resonator. Cavity mode matching can be achieved using conventional optical techniques (mirrors and lenses), but is prohibitively complex for a large number of lasers with diverse spatial mode characteristics. Optical phase conjugation can be used to generate automatic mode matching and greatly simplify the task of coupling cavities. The photorefractive process known as mutually incoherent beam coupling (MIBC) is particularly well suited to this task since the photorefractive grating that leads to coupling can be generated by mutually incoherent inputs. Thus, coupling is established without requiring the lasers to be phase locked a priori.

If the coupling paths are long and prone to mechanical instabilities, time-dependent variations in the optical path lengths can lead to relative phase fluctuations in the resonator outputs and degrade the degree of phase locking. One method for stabilizing the optical path lengths and further simplifying the alignment of the coupling beams is to use optical fibers to propagate the beam to the photorefractive crystal. One problem that arises in laser coupling via optical fibers is that of wavefront distortion due to modal diffusion and dispersion in the multimode fibers. Upon entering a multimode fiber, an input wavefront excites the corresponding propagation modes of the fiber. Scattering from impurities and structural defects causes diffusion of light into additional propagation modes. The different modes propagate with different group velocities causing severe wavefront aberrations that reduce the mode-coupling efficiency in a phase-locking setup. Modal dispersion can be avoided with single-mode optical fibers, but mode matching the laser to the fiber adds complexity to the alignment. Furthermore, a laser with a non-Gaussian output profile will not couple efficiently into the single-mode fiber. The problem of modal dispersion is effectively eliminated in multimode gradient-index fibers. Unfortunately, dissimilar propagation characteristics for meridional and skew rays lead to aberrations in the transmitted wavefront. A second source of reduced laser coupling efficiency is polarization scrambling. A polarized input beam will experience gradual depolarization as it propagates in the optical fiber. For the case of polarized laser devices, depolarization of the coupling light can introduce as much as a 50% decrease in the coupling efficiency.

Previous experiments indicate that phase conjugation in photorefractive barium titanate can compensate for wavefront distortions induced by modal dispersion. In these experiments, an image bearing beam is injected into a multimode optical fiber. The transmitted wavefront, severely distorted due to modal dispersion, is phase conjugated and retro-propagated through the same fiber. After double passing the fiber the original wavefront is reconstructed. Further studies of the two-pass fiber geometry show that phase conjugating a single polarization component of the fiber output leads to reconstruction of the input polarization as well.

SUMMARY OF THE INVENTION

The invention is a method for establishing an optical link between two lasers via an optical fiber by directing the output from one laser through an optical fiber and into a second laser and vice versa. While multimode optical fibers are useful and versatile media for propagating light, they severely distort the laser beam as it travels in the fiber. This means the transmitted light, emerging from the fiber, is not in the form of a well defined "beam of light" and therefore impossible to focus precisely into another laser. A relatively new process in optics known as "phase conjugation" can compensate for the distortions imposed by the fiber. This invention is a combination of fiber optics, used to transport the light, and optical phase conjugation, used to compensate for the fiber-induced distortions.

BRIEF DESCRIPTION OF THE DRAWINGS

The advantages, objects and features of the invention will become more apparent after considering the following description taken in conjunction with the illustrative embodiment in the accompanying drawings in which:

FIG. 4 is an experimental configuration for characterizing the effects of mode scrambling on polarization reconstruction and coupling efficiency via the two-fiber-coupled DPCM;

FIGS. 5a–5c are experimental results for the setup described in FIG. 4;

DESCRIPTION OF THE PREFERRED EMBODIMENT

Figure 1:
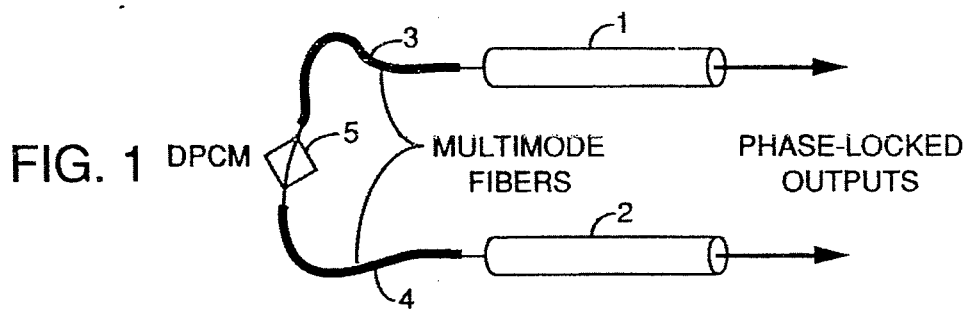
FIG. 1 is a conceptual schematic of geometry for phase locking lasers via phase-conjugate-coupled multimode optical fibers.

A conceptual schematic of the coupling geometry is shown in FIG. 1 for the case of two lasers 1 and 2. A portion of each laser's output, the rear mirror output in this illustration, is injected into multimode step-index fibers 3 and 4, respectively. After propagation through the fibers, the transmitted wavefronts are directed into a photorefractive crystal 5 oriented to form a double-phase conjugation mirror (DPCM). Light originating from laser 2 is then diffracted as the wavefront conjugate of the light originating from laser 1 and vice versa. The diffracted wavefronts then couple into the opposing fibers where the wavefront distortions are undone with propagation causing the transmitted beam to couple into the opposing lasers. Note that the wavefronts transmitted by the fibers are conjugated by the DPCM and retro-propagated through the same fibers to return to their source. However, the photons that carry the lasers' absolute phase and frequency information are diffracted in the forward directions by the DPCM to couple into the opposing lasers. Thus, light originating from laser 1 is coupled into laser 2 and vice versa. Furthermore since the multimode optical fibers lead to randomization of the wavefront and polarization, this arrangement leads to mode-matched coupling even for the case of orthogonal wavefronts. These properties make this geometry uniquely suited to the task of phase locking lasers via optical fibers.

VERIFICATION OF WAVEFRONT COMPENSATION

Figure 2:
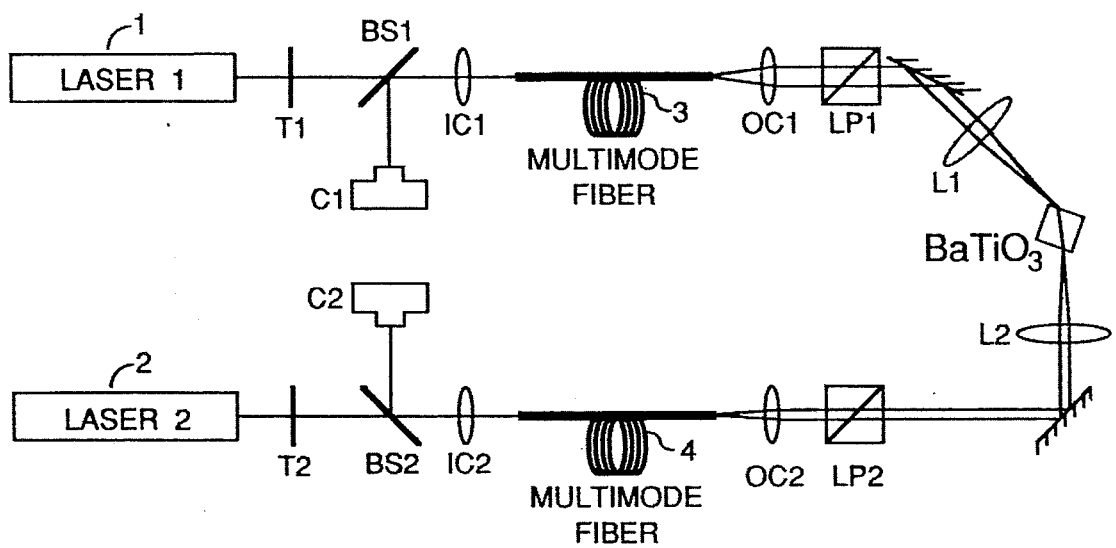
FIG. 2 is an experimental configuration for investigating compensation for modal dispersion with double-phase conjugation.
Figures 3A, 3B, 3C:
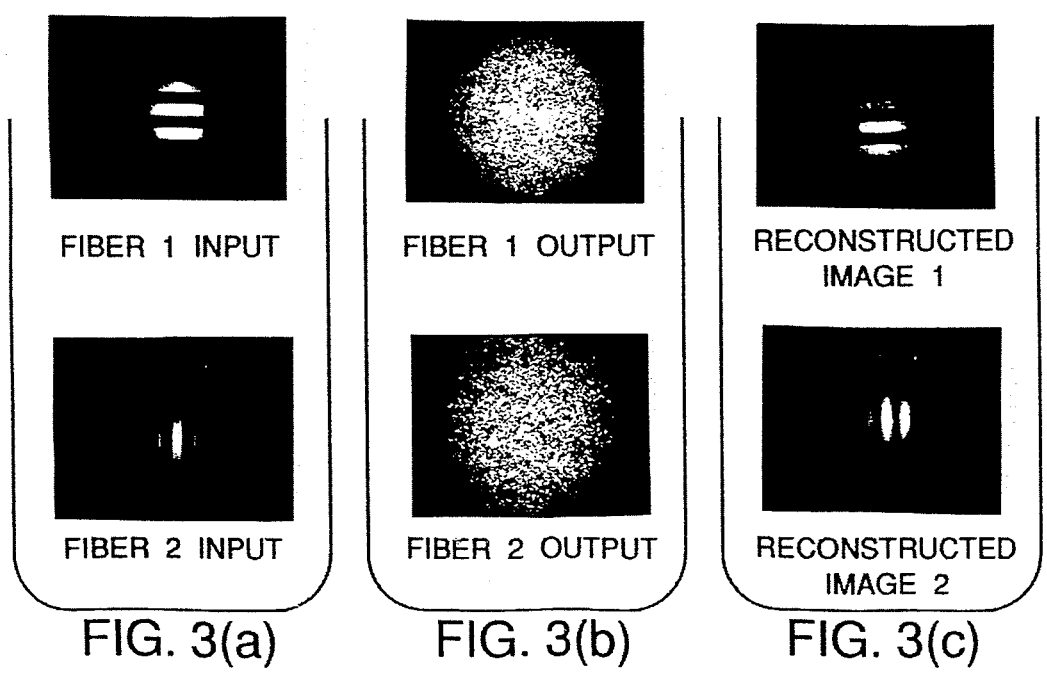
FIGS. 3a–3c are experimental results for the setup described in FIG. 2.

Compensation for modal dispersion by the two-fiber-coupled DPCM is verified using the experimental setup shown in FIG. 2. Lasers 1 and 2 are multi-longitudinal-mode helium-neon lasers operating at 633 nm with 15 mW of output power. The output fields are polarized in the plane of the figure. The wavefronts are encoded with image information by transparencies, T1 and T2, consisting of horizontal and vertical resolution bars respectively. The outputs of the transparencies T1 and T2 pass through beam splitters BS1 and BS2, respectively. Photographs of the illuminated transparencies are shown in FIG. 3(a). The image-bearing wavefronts are then injected through input coupler lenses IC1 and IC2 into two multimode step-index fibers 3 and 4, respectively. The optical fibers are Newport model FC-HC, and have a core diameter of 200 $\mu$m, a numerical aperture of 0.37, and are approximately 5 meters in length. Reflections from the fibers ends are minimized by index matching the end surfaces to microscope slides oriented at large angles relative to the surfaces. Input couplers, lenses IC1 and IC2, are 3.8 cm focal length lenses. The output couplers, lenses OC1 and OC2, consist of 2.54 cm focal length lenses and are positioned to collimate the fiber output.

Photographs of the fiber output taken in the image planes of OC1 and OC2 are shown in FIG. (b). The wavefronts are severely distorted due to modal dispersion and diffusion and show no recognizable image information. The fiber outputs, largely depolarized due to propagation effects, are then propagated through linear polarizers, LP1 and LP2, oriented to block the out-of-plane polarization components in order to reduce grating erasure effects in DPCM 5. The transmitted fields, polarized in the plane of the figure, are then focused into a barium titanate crystal oriented to form the DPCM 5. Lenses L1 and L2 are of focal length 10.0 cm and 12.5 cm respectively. The crystal orientation and input angles are identical to those described previously. Light originating from laser 2 is then diffracted in the forward direction as the wavefront conjugate of the light originating from laser 1 and vice versa. The diffracted wavefronts propagate through the opposing fibers and a portion of the transmitted fields are projected onto two charge-injection-device (CID) cameras, C1 and C2, as shown in FIG. 2. The resulting images, shown in FIG. 3(c), show reconstruction of the original input wavefronts indicating a high degree of compensation for phase aberrations introduced by the fibers.

VERIFICATION FOR COMPENSATION FOR DEPOLARIZATION

Measurements on the polarization state of light propagated by the two-fiber-coupled DPCM are made with the experimental setup shown schematically in FIG. 4. The geometry is similar to that described in FIG. 2, but with the transparencies T1 and T2 removed and the input couplers IC1 and IC2 replaced with 17.5 cm focal length lenses in order to excite only the lowest order modes of the fibers. Depolarization and the effects of modal diffusion are minimized initially by reducing the fiber lengths to approximately 90 cm each and then systematically introduced with adjustable mode scramblers MS1 and MS2 (Newport model FM-1) placed midway along each fiber.

First, the effect of the mode scrambling device on the fiber throughput is characterized for the case of a single fiber illuminated by a linearly polarized input beam. The level of mode excitation at the fiber output is determined by measuring the cone angle of light exiting the fiber. The degree of polarization of the transmitted light is determined by measuring the Stokes parameters of the output field using a quarter-wave-plate, linear polarizer and detector. The results are displayed graphically in FIG. 5(a) where the degree of polarization of the transmitted light is plotted versus the degree of fiber-mode excitation. The degree of mode excitation is defined to be the numerical aperture subtended exiting light normalized by the numerical aperture of the fiber. Each data point represents a different setting of the mode scrambling device. For the first data point, the only contribution to modal scrambling is that intrinsic to the fiber which leads to about 25% mode excitation and transmitted light that is >70% polarized. As the mode scrambler is adjusted to increase the level of mode excitation to about 75%, the degree of polarization drops to only 14%. Thus, the mode-scrambling device effectively scatters light into higher order modes and randomizes the polarization state of the light.

The polarization state of the reconstructed wavefront, generated by propagation through both fibers and the DPCM, is determined by measurement of the Stokes parameters as shown in FIG. 4. A beam splitter, BS, is oriented at a suitably small angle, $\beta/2=3°$, to sample and preserve the polarization state of the reconstructed wavefront. Approximately 70% of the energy in the wavefront transmitted by the fiber/DPCM system corresponds to the reconstructed wavefront. The remaining 30% corresponds to emission from higher order fiber modes indicating incomplete compensation for fiber-induced distortions, and leads to a weak speckle pattern about the conjugated wavefront. In this measurement, the non-conjugate component of the fiber output is blocked by aperture A. The degree of polarization reconstruction is defined as the fractional amount of light in the reconstructed wavefront that is co-polarized with the laser to which it will couple, or equivalently, the fractional amount of coupled light suitably polarized to induce phase locking. The degree of polarization reconstruction is measured with the quarter-wave-plate and linear polarizer aligned to transmit the polarization state corresponding to the output of laser 2. The results are displayed as a function of mode excitation in FIG. 5(b) using the same scaling as in FIG. 5(a). For each data point the level of mode excitation is adjusted to be the same for both fibers. The results show that the amount of reconstruction depends weakly on the degree of mode excitation, ranging from 65% for minimum mode scrambling to nearly 100% for the case where most of the fiber modes are excited. This result is somewhat surprising since it indicates that the degree of polarization reconstruction improves with increased depolarization of the fiber output. It has been shown, that spatial modulation of the input wavefronts to a DPCM leads to improved fidelity of the phase-conjugate wavefronts. This increase in fidelity may lead to improved polarization reconstruction.

VERIFICATION OF COUPLING EFFICIENCY

The net coupling efficiency for phase locking is determined by several factors. These include the power transfer efficiency of the fiber/DPCM system, the fidelity of wavefront reconstruction, and the degree of polarization reconstruction. Using the setup described in FIG. 4 with aperture, A, approximately defining the transverse mode of laser 2, a measurement is made of the fractional amount of light that is emitted by laser 1 and transmitted by the fiber/DPCM system with the appropriate polarization state and transverse profile for coupling to laser 2. The results are displayed versus the degree of fiber mode excitation in FIG. 5(c). The maximum measured coupling efficiency of about 2.0% occurs for the case of minimum mode scrambling. Several factors limit the coupling efficiency. Foremost is the diffraction efficiency for the DPCM in this setup; approximately 16% for the case of minimum mode scrambling. The second limiting factor is low transmission of the phase conjugate beams retro-propagating through the fibers. While the forward fiber transmission is approximately 80%, the backward transmission if measured to be only about 40%. This asymmetry most likely results from imperfect phase conjugation at the DPCM leading to spatial frequency components that do not couple back into the fibers. Incomplete compensation of the fiber-induced distortions further limits the coupling efficiency causing only 70% of the light transmitted by the fiber/DPCM system to correspond to the reconstructed wavefront. Finally, depolarization of the fiber throughput leads to losses at linear polarizers LP1 and LP2.

As the degree of mode excitation is increased, the net coupling efficiency decreases to less than 0.5% as shown in FIG. 5(c). This decrease is largely due to a reduction in diffraction efficiency at the DPCM. As the level of fiber mode excitation increases from 0.25 to 0.75, the measured DPCM efficiency decreases from about 16% to less than 5%. Additional losses result from the increased depolarization of the fiber throughput and the corresponding losses at the linear polarizers. These results suggest that broadening the spatial frequency spectrum leads to a reduction in diffraction efficiency for the DPCM. This speculation is further supported by measurement of 45% diffraction efficiency achieved with the same crystal sample for the case of focused Gaussian beams.

The vertical error bars indicate time-dependent fluctuations in the coupling efficiency. These fluctuations occur on a time scale of several minutes, corresponding to the buildup time for the DPCM. The instability may result from perturbations on the fiber output wavefronts caused by small mechanical displacements of the fiber. The result is washout of existing photorefractive gratings and evolution of new ones in their place. The high spatial frequencies present in the fiber output may serve to increase the sensitivity of the photorefractive grating to changes in the input wavefronts. These results indicate the optical fiber does not necessarily isolate the coupling beams from environmental disturbances. With appropriate shielding of the fiber however, it should be possible to minimize these effects.

VERIFICATION OF PHASE LOCKING

Figure 6:
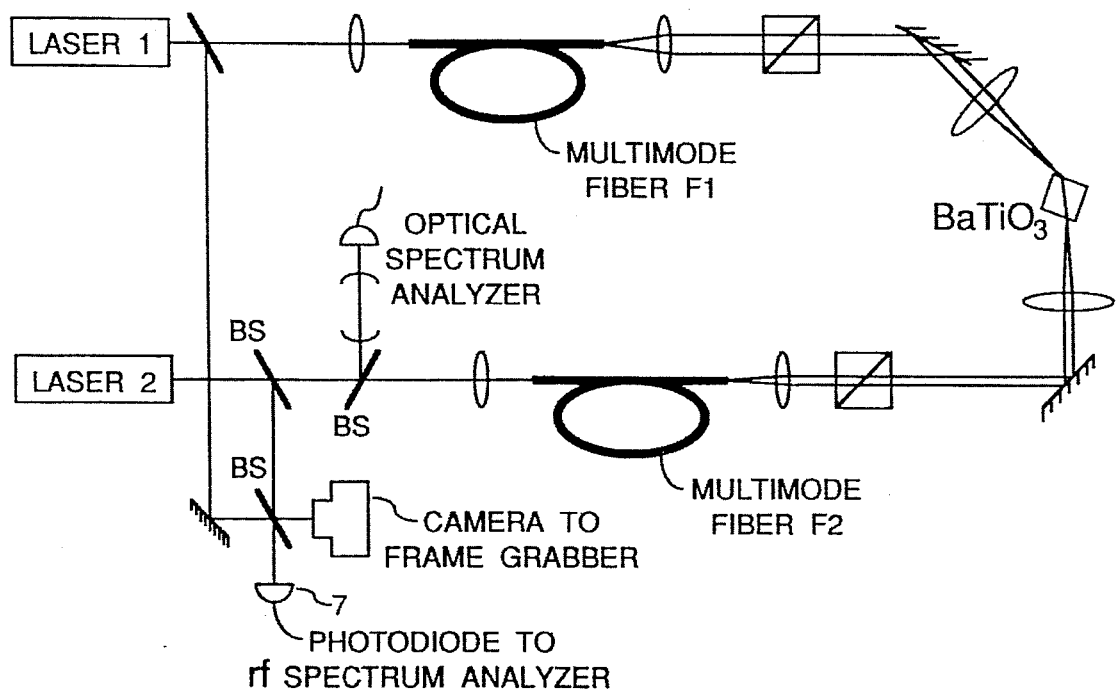
FIG. 6 is an experimental configuration for demonstrating phase locking via the two-fiber-coupled DPCM.
Figure 7A:
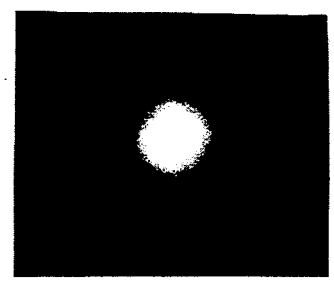
FIGS. 7a and 7b show interferograms of the laser outputs for the case of (a) non-zero frequency detuning and (b) zero detuning. The high-contrast fringes shown in figure (b) indicate mutually coherent outputs resulting from phase locking.
Figure 7B:
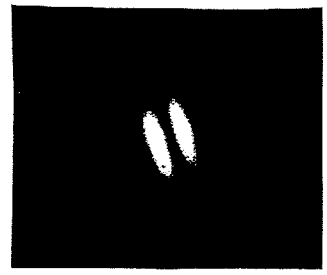

Phase locking via the two-fiber-coupled DPCM is demonstrated with the experimental geometry shown in FIG. 6. The setup is similar to that in FIG. 4 with the addition of diagnostics for characterizing the phase locking process. In this experiment, the mode scramblers are removed and the residual mode excitation due to modal diffusion is about 25% corresponding to emission from about 90 fiber modes. The frequency detuning of the two lasers is monitored by combining a portion of the two outputs on a fast photodiode 7 and sending the detector output to an rf spectrum analyzer. The mutual coherence of the two lasers is measured by combining a portion of the two outputs at a small crossing angle on a CID camera and analyzing the interference pattern with a frame grabber and personal computer. The lasing spectrum of laser 2 is monitored with a scanning confocal spectrum analyzer as shown. FIG. 7(a) shows a photograph of the combined laser outputs for the case where the lasers are detuned from one another. The interferogram reveals no interference fringes indicating the lasers are mutually incoherent. In FIG. 7(b), the lasers are temperature tuned until their spectra coincide. The resulting interferogram shows high-contrast fringes. Numerical analyses of the intensity modulation indicates the mutual coherence of the two laser outputs is 0.9.

Figure 8A:
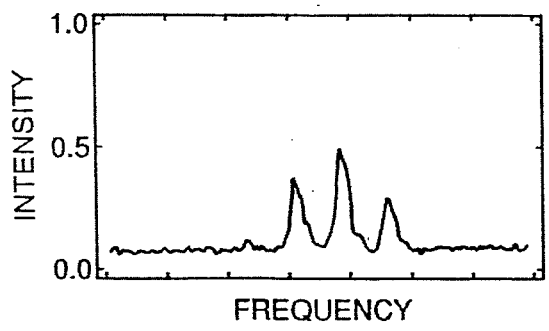
FIGS. 8a and 8b are lasing spectrums for the case of (a) non-zero frequency detuning and (b) zero detuning. During phase locking the four-mode spectrum narrows to a single longitudinal mode.
Figure 8B:
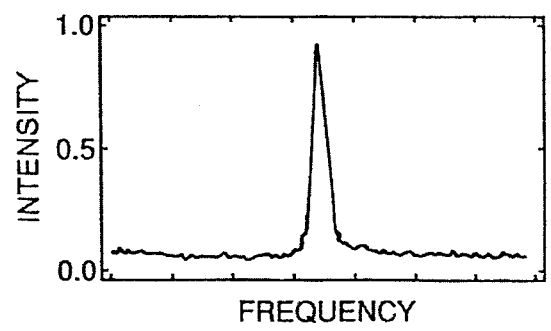

The corresponding spectra for the output of laser 2 are shown in FIG. 8. FIG. 8(a) shows the lasing spectrum for the case where the lasers are detuned from one another. The spectrum consists of a Gaussian distribution of four longitudinal modes spaced at about 300 MHz and is identical to that obtained in the absence of coupling. The spectrum for laser 1 is qualitatively similar. When the lasers are tuned to a common spectrum to induce phase locking, the spectrum is modified dramatically as shown in FIG. 8(b) (same scale as FIG. 8(a)). One of the longitudinal modes shows a dramatic enhancement while the adjacent modes appear to be suppressed. We speculate the following explanation: Since the two laser cavities are not identical in length, it is not possible to overlap the frequencies of all the longitudinal modes simultaneously. When one mode is made coincident with its counterpart from the other laser, the mode experiences enhanced feedback due to the presence of the second resonant cavity. Since the adjacent modes are within the Lorentzian wings of the homogeneous profile, the gain for these modes is suppressed due to the increase in stimulated emission into the enhanced mode. This result appears to be intrinsic to the type of lasers we are using and persists with the optical fibers removed from the setup. Spectral narrowing leads to substantial enhancement of the coherence length of the laser outputs and offers the added benefit of eliminating the need for careful pathlength matching typically required for observations of phase locking in broadband lasers. Previously, it was reported that mutually coherent inputs to the DPCM lead to a diffraction efficiency that is approximately 10 times less than that produced by mutually incoherent inputs. In this experiment, thermal drift of the cavity lengths limit the time over which the lasers remain phase locked to a few seconds. This time interval is insufficient to observe reductions in coupling frequency due to grating competition and washout.

ALTERNATIVES

Figure 9A:
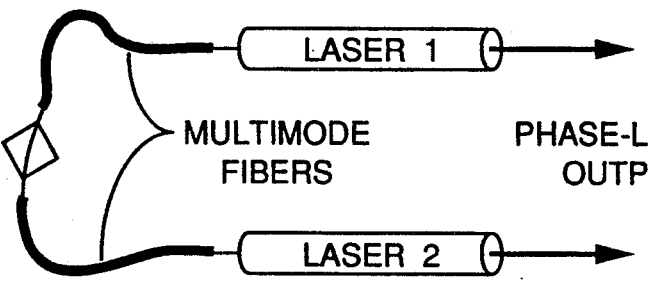
FIGS. 9a–9c show alternate geometries for optical coupling of lasers with the fiber-coupled double-phase-conjugate mirror. (a) two-fiber geometry. (b) one-fiber geometry. (c) daisy-chained fiber/DPCM geometry.
Figure 9B:
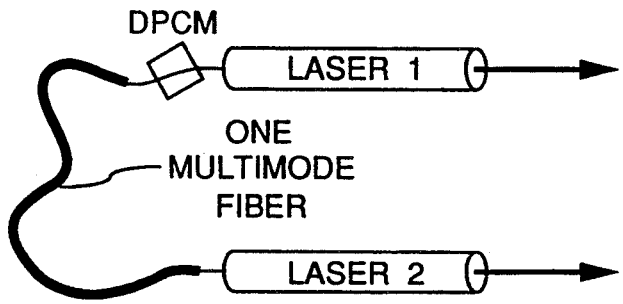
Figure 9C:
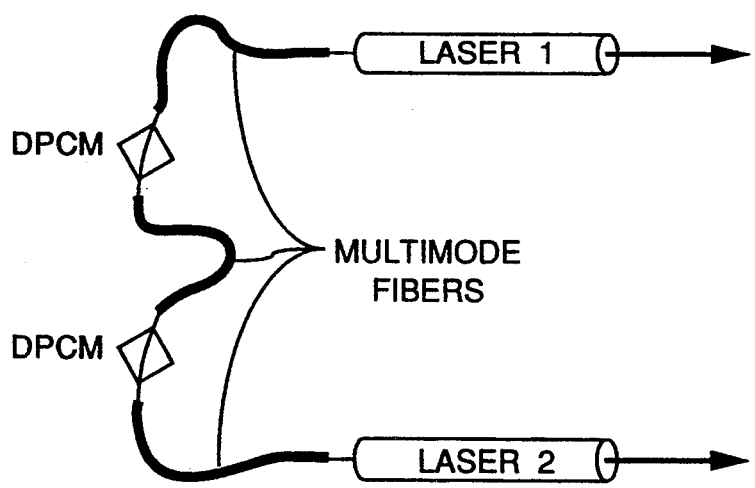

There are no constraints on the relative lengths of the two multimode fibers. For example, they may be of equal lengths, unequal lengths, or one fiber could be removed entirely from the setup. See FIGS. 9(a) and 9(b). In principle, the fibers and crystals could also be linked in tandem as shown in FIG. 9b.

While the invention was reduced to practice using multimode optical fiber to confine and direct the beams of light, the invention is also applicable to waveguides in general, such waveguides including multimode fibers, single mode fibers and planar waveguides. For example, the invention may find utility in an integrated solid state electronic device consisting of miniature diode lasers whose outputs are directed into waveguide channels that transport the light to double-phase-conjugation coupling regions.

Moreover, while the invention was reduced to practice using a crystal of barium titanate to generate the double-phase conjugation, in principle, the same interaction could be generated in any material belonging to the class of nonlinear media known as photorefractives. Future developments may allow the double-phase conjugation process to occur in other types of media and devices.

In addition, while the invention was reduced to practice for the purpose of phase locking lasers, whereby the outputs of the coupled lasers synchronize to behave as a single, larger laser, the invention will also be useful for any application that requires and optical link between lasers. One such example is fiber-optic communication, wherein the fiber coupled DPCM would be used to establish an optical link between two lasers separated by an arbitrary distance. Information could then be temporally encoded on the laser outputs to send information via the optical link from one end of the system to the other, thus enabling persons at each end of the system to talk with one another.

Clearly, many other modifications and variations of the present invention are possible in light of the above teachings and it is therefore understood, that within the inventive scope of the inventive concept, the invention may be practiced otherwise than specifically claimed.

What is claimed is:

1. A method for phase locking first and second lasers in which coupling beams propagate in first and second waveguides comprising the steps of:
   (a) injecting at least a portion of the output of said first laser into the first of said waveguides;
   (b) injecting at least a portion of the output of said second laser into the second of said waveguides;
   (c) after propagation through said waveguides, double phase conjugating each of said outputs from said first and second lasers;
   (d) injecting the double phase conjugated output of said first laser into said second laser; and
   (e) injecting the double phase conjugated output of said second laser into said first laser.

2. The method of claim 1, wherein said outputs from said first and second lasers are double phase conjugated by applying said outputs into a photorefractive crystal oriented to form a double phase-conjugate mirror.

3. The method of claim 2, wherein said first and second waveguides are multimode step-index optical fibers.

4. A method for phase locking first and second lasers in which coupling beams propagate through at least one waveguide comprising the steps of:
   (a) injecting at least a portion of the output of said first laser into said waveguide;
   (b) injecting at least a portion of the output of said second laser into said waveguide;
   (c) after propagation through said waveguide, double phase conjugating each of said outputs from said first and second lasers;
   (d) injecting the double phase conjugated output of said first laser into said second laser; and
   (e) injecting the double phase conjugated output of said second laser into said first laser.

5. The method of claim 3, wherein said outputs from said first and second lasers are double phase conjugated by applying said outputs into a photorefractive crystal oriented to form a double phase-conjugate mirror.

6. The method of claim 5 wherein said waveguide comprises one multimode step-index optical fiber.

7. A system for phase locking first and second lasers comprising:
   first and second multimode step-index optical fibers;

means for injecting at least a portion of the output of said first laser into the first of said multimode step-index optical fibers;

(b) means for injecting at least a portion of the output of said second laser into the second of said multimode step-index optical fibers;

(c) means for double phase conjugating each of said outputs from said first and second lasers after propagation through said multimode step-index optical fibers;

(d) means for injecting the double phase conjugated output of said first laser into said second laser; and (e) means for injecting the double phase conjugated output of said second laser into said first laser.

8. The system of claim 7, wherein said outputs from said first and second lasers are double phase conjugated by applying said outputs into a photorefractive crystal oriented to form a double phase-conjugate mirror.

9. A system for phase locking first and second lasers, comprising:
   at least one waveguide;
   (b) means for injecting at least a portion of the output of said second laser into said waveguide;
   (c) means, after propagation through said waveguide, for double phase conjugating each of said outputs from said first and second lasers;
   (d) means for injecting the double phase conjugated output of said first laser into said second laser; and
   (e) means for injecting the double phase conjugated output of said second laser into said first laser.

10. The system of claim 9 wherein said waveguide is a multimode step-index optical fiber.

11. The system of claim 10, and a photorefractive crystal oriented, and wherein said outputs from said first and second lasers are double phase conjugated by applying said outputs into said photorefractive crystal, said photorefractive crystal being oriented to form a double phase-conjugate mirror.

12. A system for phase locking first and second lasers having a light output, comprising:
   first and second multimode fibers;
   means for propagating the light output of said first laser through said first multimode fiber;
   means for propagating the light output of said second laser through said second multimode fiber;
   a double phase conjugate mirror, the outputs from said first and second multimode fibers being applied to said double phase conjugate mirror;
   means for injecting the double phase conjugated output of said first laser into said second laser; and
   means for injecting the double phase conjugated output of said second laser into said first laser.

* * * * *